July 4, 1950  A. IEZZI  2,513,648
METHOD AND APPARATUS FOR APPLYING WALL FINISHES
Filed May 14, 1948
*Fig.2*
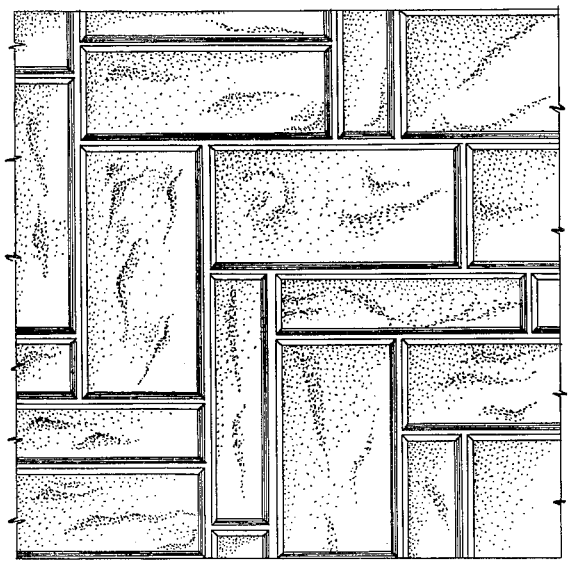
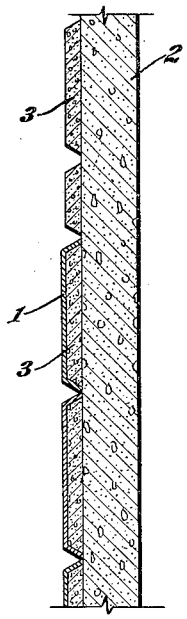
*Fig.3*
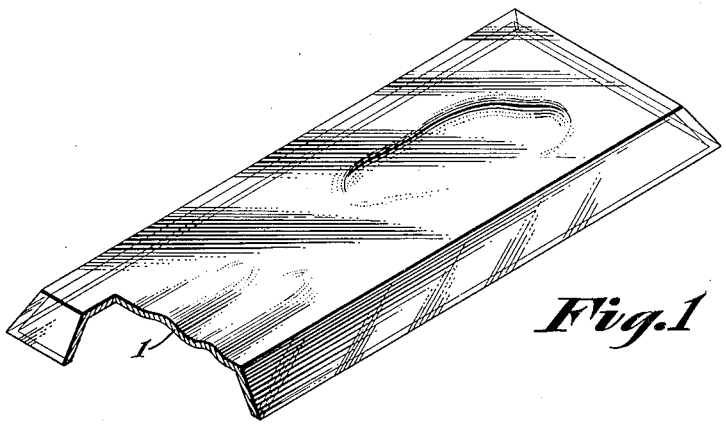
*Fig.1*
Inventor
ALFRED IEZZI
By W. J. & D. M. Stewart
ATTORNEYS Patented July 4, 1950

2,513,648

UNITED STATES PATENT OFFICE 2,513,648

METHOD AND APPARATUS FOR APPLYING WALL FINISHES

Alfred Iezzi, Reading, Pa.

Application May 14, 1948, Serial No. 26,950

6 Claims. (Cl. 18—59)

This invention relates to wall finishes; more specifically, to a method and apparatus for applying a plaster or cement coating to a wall in a manner so as to give the wall the appearance of being built up of pieces of stone, cement blocks or similar construction units.

It is well known in the art to use forms molded in the shape of pieces of stone to apply a wall coating while the wall coating material is in a plastic condition so as to give a stone-like shape to the surface when the forms are removed. A common method of applying such finish to a wall is disclosed by the patent to E. J. Miller, No. 1,888,234, issued November 22, 1932, wherein a tool is employed, which tool includes a plunger slidable in a casing, the working surface of which plunger is molded in the shape of the outer surface of a stone block, and which plunger is forceably pressed within the container against a section of plastic wall coating material in order to mold such section into the shape of a stone block. An outstanding disadvantage of such tool is that it is complicated in construction, cumbersome, heavy, and requires the exertion of substantial manual pressure. Moreover, waxed paper is required to cover the face of the plunger to prevent adhesion of the plaster material to the plunger upon removal of the latter. Also, since the plaster block or section against which pressure is exerted is completely concealed by the plunger-receiving container, it is difficult to determine when the plaster material has been properly positioned and set sufficiently to permit withdrawal of the plunger and removal of the mold, particularly under varying weather conditions.

An object of the present invention is to provide a novel method and apparatus for applying wall finishes to simulate stone blocks, which are devoid of the disadvantages of prior art methods and apparatus such as that disclosed in the aforesaid Miller patent.

A more specific object of the invention is to provide a novel mold for applying and shaping plaster coating stone-like sections on a wall, and which is light in weight, resistant to breakage, and has a very smooth, glossy surface, thereby eliminating the necessity for waxed paper, dusting powder, and other means to facilitate separation of the mold form from the plaster coating sections.

Another specific object of the invention is to provide a novel method of applying a plurality of molds in succession to enable finishing of two consecutive areas of a wall in a minimum period of time.

A more specific object of the invention is to provide a novel mold for applying and shaping plaster coating material to simulate a stone block, which mold is of transparent plastic material to enable viewing of the block being molded to determine when the block has been properly placed and separated sufficiently from the mold so as to enable removal of the mold without marring the finish of the block.

Other objects and advantages of the present invention will become apparent from a study of the drawings wherein:

Fig. 1 is a perspective view of a transparent plastic mold or form shown partly broken away and having the shape of a stone block and embodying the principles of the present invention;

Fig. 2 is an elevational view of a finished wall, the individual blocks of which have been shaped by molds similar to that shown in Fig. 1 and of different sizes, and Fig. 3 is a longitudinal cross sectional view of the wall shown in Fig. 2 and illustrating forms as applied to certain wall block sections and removed from others to expose the finished wall surface.

Referring more particularly to Fig. 1, numeral 1 denotes a mold or form which has been made in the shape of a stone block. The form may be made in master dies and should have a very smooth, glossy surface. The form is somewhat dished-shaped and preferably made of transparent plastic material, such as vinyl polymers (for example, "Vinylite") or perhaps methyl methacrylate, known as "Lucite," or any other transparent plastic material having a glass-like surface. Even glass may be suitable for some purposes, however, I prefer the lighter, unbreakable and somewhat flexible plastic materials. Forms, such as denoted by numeral 1, may be made of rectangular or other shapes and in different sizes, if desired. For example, they may be made in sizes ranging from two inches by eight inches to eight inches by twenty-four inches. Different sizes may be interfitted in the manner illustrated in Fig. 2 so as to give the appearance of a wall made of blocks of stone of different sizes such as are commonly used in stone walls. For instance, about twenty-one form units may be fitted to cover one square yard. A complete set may consist of one hundred and five form units which will cover five square yards of wall surface, which is a convenient area to be covered at one time. It should be understood, however, that the above specified sizes and numbers of units or forms to cover a given area are merely illustrative of convenient sizes and areas to be covered in succession, it being apparent that larger or smaller sizes may be equally suitable and a different sized area may be covered at one time.

A wall may be built up by applying an undercoating 2 of plaster or cement on lath made of metal or other suitable material (not shown) or directly on concrete blocks or other base surface. This undercoating is allowed to set about forty-eight hours, or at least until sufficiently hardened to permit application of a finishing coating. A second or finishing coating 3 of plaster, cement, stucco or other plaster-like material is then applied on undercoating 2 by means of my improved molds, as follows:

Molds of the nature of that indicated by reference 1 in the drawing of proper size and desired shape, preferably are separately filled with the plaster coating material and then individually pressed into position against the undercoating plaster layer 2. These molds are desirably placed in a sequential order and in associated juxtaposition to produce an ordered arrangement of their separate units to cover a determined wall surface. And these molds, due to their light weight and the adhesion of their plaster contents to the undercoating material 2, will remain in place without manual support, and permit a time and labor saving application of a plurality of molds in a continuous order of placement. And, further, the transparency of the molds facilitates accurate and assured proper application of each in their selected pattern arrangement. Each filled mold is lightly, but sufficiently pressed against the undercoating material 2, and desirably given a slight lateral movement to assure adhesion of its plaster contents to said undercoating material and to impart to said mold material a stone-like shape. The molds are allowed to remain seated on the undercoating material for a predetermined time before removal. Such time would vary in accordance with weather conditions and may be of the order of three hours.

The above described manner of applying the finishing coating 3 may be modified under certain circumstances and with suitable material. For instance such finishing plaster material 3 may be spread in a layer over a definite area of the undercoating layer 2, and then the unfilled molds 1 simply pressed in an ordered sequence into said layer of material 2, to impart to the latter shaped units to form the intended simulation of a stone wall section.

As the plaster or cement material sets or dries, it draws away freely from the molds. In view of the transparency of the molds, the plaster material underneath may be viewed so as to visually determine with certainty whether the molded material has become sufficiently set and thereby has become separated from the molds enough to permit removal of the forms or molds. Inasmuch as the transparent plastic forms have very smooth, glass-like surfaces, the molded section or block will become separated without adhesion of fragments of plaster material to the form and without the necessity of interposing wax paper, dusting powder, oil, or the like between the form and the plaster material as is commonly required in the art. To facilitate removal of the forms, they may be gently tapped. After the molded parts have become set, the molds are separately removed in succession, preferably in the same order in which they were applied.

After removal of the forms from a given area of the wall, for example, an area of five square yards, they may then be applied to the next five square yards to impress the plaster material thereon in the same manner, and then to the next five, and so on, in this manner covering the entire wall area.

As shown in Fig. 2, molds of different sizes may be impressed on the plastic coating in any desired configuration so as to simulate a wall made of different sized stone blocks. If desired, the molds may be other than rectangular shaped, such as triangular, or of other irregular shapes.

The forms give a smooth finished surface to the plaster coating units because of their smooth plastic surface.

After removal of the forms, the joints may be pointed as is common in stone walls.

Thus it will be seen that I have provided an efficient, relatively simple, light and inexpensive transparent plastic form for application of shaped plaster coating material to building walls, a number of which may be applied by a single laborer who need not have any special skill, as required by stone masons. In view of the lightness and ease of application and removal of the forms involved in the present invention, a single laborer may do the same work of six men using other conventional and more bulky forms intended for the same purpose.

While I have illustrated certain specific embodiments of my invention, it will be understood that these are by way of illustration only, and that various changes and modifications may be made within the contemplation of my invention and within the scope of the following claims.

I claim:

1. The method of applying a plaster coating to a building wall so as to simulate stone or other block formation, comprising coating a wall surface with a plastic material and applying a plurality of transparent plastic forms in succession in juxtaposition in a manner so as to make an impression on the plastic material conforming to the shapes of the forms, and, by viewing through the transparent forms, visually determining when the material has separated from the forms and has become set, thereafter separately removing said forms and finally pointing the boundaries.

2. The method of applying a cementitious plastic coating to a building wall so as to give it the appearance of being built up of stone blocks, comprising filling, with cementitious plastic material, a multiplicity of rectangular shaped molds having dished, stone-shaped surfaces and being of different sizes, and applying said molds in succession in contiguous relationship on a wall to be coated and thereby adhering molded sectional units thereon in a manner resembling stone pieces, and finally removing said forms.

3. The method of applying a coating of plastic material to a wall surface so as to simulate stone blocks comprising filling, with plastic material, a multiplicity of rectangular-shaped molds of different sizes and relative proportions between length and width, and directly grasping and seating said forms in applied succession in juxtaposition against the wall to be coated, leaving said forms seated on the wall for a predetermined period of time to allow at least partial setting of the molded, plastic material, and finally removing said forms.

4. A set of molding forms for applying a multiplicity of stone shaped sectional units, of a cementitious plastic material, in contiguous relationship on a building wall in a manner so as to simulate a stone wall, comprising a multiplicity of rectangular, shallow, dished plates of different sizes whose edges are adapted to be interfitted in contiguous relationship like stone pieces of a stone wall and whose surfaces are smoothed and glossy and of the configuration of different stone surfaces, said forms being made of organic thermoplastic material having relatively small adherence to cementitious plastic material so as to receive and freely release with minimum adherence a supply of cementitious plastic coating material for adherence to a building wall.

5. A set of molding forms for applying a multiplicity of stone shaped sectional units, of a cementitious plastic material, in contiguous relationship on a building wall in a manner so as to simulate a stone wall, comprising a multiplicity of rectangular, shallow, dished plates of different sizes whose edges are adapted to be interfitted in contiguous relationship like stone pieces of a stone wall and whose surfaces are smooth and glossy and of the configuration of different stone surfaces, said forms being made of substantially transparent methyl methacrylate so as to receive and freely release with minimum adherence a supply of cementitious plastic coating material for adherence to a building wall.

6. A set of molding forms for applying a multiplicity of stone shaped sectional units, of a cementitious plastic material, in contiguous relationship on a building wall in a manner so as to simulate a stone wall, comprising a multiplicity of rectangular, shallow, dished plates of different sizes whose edges are adapted to be interfitted in contiguous relationship like stone pieces of a stone wall and whose surfaces are smooth and glossy and of the configuration of different stone surfaces, said forms being made of a vinyl polymer so as to receive and freely release with minimum adherence a supply of cementitious plastic coating material for adherence to a building wall.

ALFRED IEZZI.

REFERENCES CITED

The following references are of record in the file of this patent:

UNITED STATES PATENTS

| Number | Name | Date |
|---|---|---|
| 457,231 | Stevens | Aug. 4, 1891 |
| 613,085 | Smith | Oct. 25, 1898 |
| 836,369 | Dexter | Nov. 20, 1906 |
| 1,562,519 | Ruppel | Nov. 24, 1925 |
| 1,789,791 | Tonnessen et al. | Jan. 20, 1931 |
| 1,960,276 | Miller | May 29, 1934 |
| 2,177,461 | Ruthven | Oct. 24, 1939 |
| 2,286,531 | Fralick | June 16, 1942 |
| 2,402,528 | Bean | June 25, 1946 |
| 2,433,210 | Gits | Dec. 23, 1947 |
| 2,433,211 | Gits | Dec. 23, 1947 |